Figure 1:
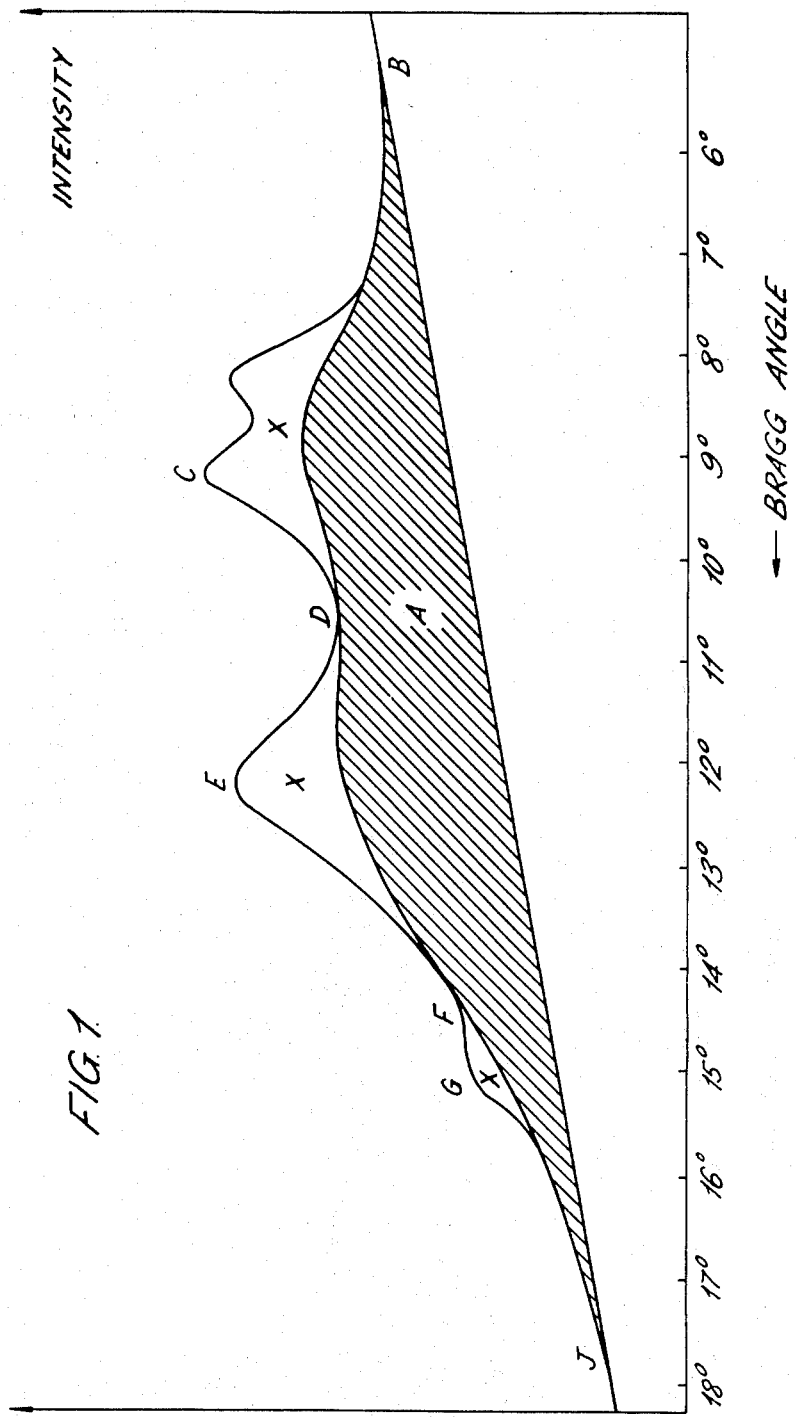

United States Patent [19]
Sturt

[11] 3,856,767
[45] Dec. 24, 1974

[54] POLYMERISATION PROCESS

[76] Inventor: Alan Charles Sturt, 10 Cunningham Ave., Guildford, Surrey, England

[22] Filed: Apr. 18, 1972

[21] Appl. No.: 245,193

[30] Foreign Application Priority Data
Apr. 21, 1971 Great Britain.................. 10396/71

[52] U.S. Cl................. 260/92.8 R, 260/78.5 CL, 260/85.5 XA, 260/87.1, 260/86.3, 260/87.5 C, 260/92.8 W
[51] Int. Cl............................ C08f 1/04, C08f 1/11
[58] Field of Search................ 260/92.8 R, 92.8 W

[56] References Cited
UNITED STATES PATENTS

| | | | |
|---|---|---|---|
| 3,067,186 | 12/1962 | Bessant............................ | 260/92.8 |
| 3,332,918 | 7/1967 | Benetta............................ | 260/85.5 |
| 3,380,946 | 4/1968 | Crano.............................. | 260/29.6 |
| 3,520,867 | 7/1970 | Monaco............................ | 260/92.8 |
| 3,523,111 | 8/1970 | Bibeau............................. | 260/92.8 |
| 3,536,675 | 10/1970 | Fagnoni........................... | 260/78.5 |
| 3,652,525 | 3/1972 | Nakamura...................... | 260/92.8 W |
| 3,683,051 | 8/1972 | Chatelain........................ | 260/878 R |
| 3,687,917 | 8/1972 | Wisseroth................... | 260/85.5 X A |
| 3,725,375 | 4/1973 | Sturt............................. | 260/92.8 W |

FOREIGN PATENTS OR APPLICATIONS

| | | |
|---|---|---|
| 847,676 | 9/1960 | Great Britain |
| 931,629 | 7/1963 | Great Britain |

OTHER PUBLICATIONS

J.P.S. 41, p. 79–81, 1959.

*Primary Examiner*—Joseph L. Schofer
*Attorney, Agent, or Firm*—Brooks, Haidt, and Haffner

[57] ABSTRACT

To obtain high or low crystalline pvc vinyl chloride is polymerised under conventional conditions in the presence of a finely divided seed polymer having an order factor above 16 or below 10. The seed materials can only be made by polymerising vinyl chloride under non-conventional conditions.

7 Claims, 1 Drawing Figure

POLYMERISATION PROCESS

The present invention relates to a process for the production of vinyl chloride polymers by free radical polymerisation. By vinyl chloride polymer is meant throughout this specification polyvinyl chloride or a copolymer of vinyl chloride containing a major proportion of vinyl chloride and preferably not more than 20% by wt of copolymerisable materials. Such polymers are obtained by the polymerisation of vinyl chloride monomer, which expression will be used hereafter to refer to vinyl chloride itself or a mixture of vinyl chloride with a copolymerisable compound or compounds in such a proportion that on polymerisation one obtains a vinyl chloride polymer as defined above. Typical copolymerisable materials are acrylonitrile; vinyl acetate; olefins such as vinylidene chloride ethylene, propylene, isobutene and 4-methyl pentene-1; acrylate and methacrylate esters, e.g., methyl methacrylate; and fumarate and maleate esters.

Vinyl chloride polymers have been produced having widely different crystallinities and as a result their properties have differed. The percentage crystallinity of a polymer may be measured according to the method described in British patent specification No. 847,676. The method used in that patent is described as follows:

A sample of the polymer is obtained in the form of a thin sheet (about 0.003 thick) either by pressing at 160°C or (if more convenient) by casting from solution in tetrahydrofuran on to a glass plate. After the sheet has been annealed by heating for 3 hours at 150°C and cooling slowly to room temperature in order to crystallise it to the maximum extent, it is mounted in a cylindrical X-ray diffraction camera normal to the beam, and an X-ray diffraction photograph is obtained using copper $K\alpha$ radiation which has been filtered so that only the $K\alpha$ radiation is used. The variation of intensity with Bragg angle of the photograph is obtained by making a microphotometer traverse along the equator of the photograph. To obtain the percentage crystallinity of the sample, the intensity of the photograph is compared by a method similar to that of J. L. Matthews, H. S. Peiser and R. B. Richards (Acta Crystallographica, Volume 2 (1949) pages 85–9) with a curve for amorphous polyvinyl chloride, which is shown in the drawing accompanying the Provisional Specification of British Pat. No. 847,676. To obtain a substantially amorphous sample of polyvinyl chloride, to which this curve relates, a sample about 1 mm thick was cut from a sheet of transparent, unplasticised polyvinyl chloride sold under the Registered Trade Mark Darvic; this was placed between metal glazing plates forming a sandwich, was heated on a hot plate until the polymer was molten, and, while the polymer was still molten, the sandwich was immersed in cold water. A microphotometer transverse along the equator of an X-ray diffraction photograph of this quenched sample, obtained in the manner already described, provided the curve of the drawing accompanying the Provisional Specification of British Pat. No. 847,676 in which the intensity is plotted against the Bragg angle shown in degrees along the horizontal axis of the drawing.

The drawing accompanying the Complete Specification of British Pat. No. 847,676 shows a curve BCDEFGJ obtained for a sample of crystalline polyvinyl chloride. Also shown in this drawing is a curve BDFJ for an amorphous sample taken from the drawing accompanying the Provisional Specification of British Pat. No. 847,676. The curve for the amorphous sample is chosen so that its trough just touches the curve BCDEFGJ at the point D, where it is assumed that there is no crystalline diffraction, and so that it fits the curve BCDEFGJ at high and low angles. The straight line BJ indicates the back-ground level of intensity and the area below this line is ignored when calculating the crystallisability of the sample.

The percentage crystallisability of the sample to which the curve BCDEFGJ relates is equal to $100X/A + X$ where A is the area bounded by the straight line BJ and the curve for the amorphous sample and where X is the sum of the areas between the curve for the crystalline sample and the curve for the amorphous sample. The percentage crystallinity of the sample to which the curve BCDEFGJ relates is thus approximately 25%. The accompanying FIG. 1 is a copy of the drawing accompanying the Complete Specification of British Pat. No. 847,676.

Throughout this specification the crystallinity of polymers is expressed as an order factor which is the same as the percentage crystallinity described in specification No. 847,676 except that it is the average value of the percentage crystallinities determined at 50°C, 80°C, 110°C and 140°C and that in the calculation of each percentage crystallinity the small area at G is ignored in calculating the value of X.

The crystallinity of a vinyl chloride polymer as measured by its order factor depends to a great extent upon the temperature at which it was formed by free radical polymerisation of the vinyl chloride monomer. Conventional free radical processes for the manufacture of vinyl chloride polymers which are capable of being carried out on an industrial scale usually require a polymerisation temperature between 30° and 80°C and, most suitably between 43° and 70°C. Such processes usually provide vinyl chloride polymers having order factors in the range 10 to 16. The order factors of a number of commercially available vinyl chloride polymers are given in Table 1.

Table 1

| Vinyl Chloride Polymers | Average order factors |
|---|---|
| Breon 115 | 15.9 |
| Breon 113 | 14.7 |
| Breon 107 | 12.7 |
| Corvic D50/16 | 12.7 |
| Lucovyl GB8010 | 13.3 |
| Pevikon KL-2 | 14.2 |
| Vestolit G | 15.8 |

Breon 115, 113, and 107 are made by BP Chemicals International Limited (U.K.); Corvic D50/16 is made by Imperial Chemicals Industry Limited (U.K.); Lucovyl GB8010 is made by Pechiney-Saint Gobain (France); Pevikon KL-2 is made by Kema-Nord (Sweden); and Vestolit G is made by Chemische Werke Huls A. G. (W. Germany).

An object of the present invention is to provide a process for the production of a vinyl chloride polymer having an order factor above 16 or below 10 using a conventional free radical polymerisation process i.e., a process carried out at a temperature between 30° and 80°C.

Accordingly the present invention is a process for the production of a vinyl chloride polymer (as herein defined) which comprises adding a seed vinyl chloride polymer in a finely divided form having an order factor above 16 or below 10 respectively to vinyl chlorode monomer (as herein defined) and polymerising the vinyl chloride monomer in suspension or in mass under free radical polymerisation conditions with said seed polymer dispersed therein at a temperature in the range 30° 80°C to produce a vinyl chloride polymer having an order factor above 16 or below 10 respectively.

Techniques for the polymerisation of vinyl chloride monomer in order to produce either more crystalline or less crystalline polymers are well known and may involve mass, suspension or emulsion polymerisation techniques. Generally in order to produce a more crystalline product using a free radical polymerisation initiator it is necessary to polymerise at a low temperature and similarly in order to produce a less crystalline material it is necessary to polymerise at a high temperature. Descriptions of such polymerisation processes are to be found in the "Structure and Properties of crystalline polyvinyl chloride" by G. Pezzin in "Plastics and Polymers," August, 1969, page 295 et seq. Vinyl chloride polymers having either more crystalline or less crystalline structure can also be prepared by polymerising vinyl chloride using a variety of ionic and coordination complex catalysts. Such a process is described in British patent specification No. 847,676.

The seed vinyl chloride polymer is in a finely divided form when it is added to the vinyl chloride monomer. By finely divided is meant that the vinyl chloride polymer particles have an average size preferably less than 200 $\mu$m. Preferably the size of the seed polymer particles is below 100 $\mu$m and generally the best results are obtained with vinyl chloride polymer seeds having a particle size below 10 $\mu$m. The polymerisation techniques described above for the preparation of more crystalline or less crystalline polymers can readily be adapted so that the product is in a suitably finely divided form.

The finely divided seed polymer may be added to the monomer and distributed therein by any suitable means. The precise technique adopted will depend to a great extent on the method used for the production of the seed polymer and the form in which the seed polymer is produced. For example if the seed polymer is produced by mass polymerisation it is usually most convenient to stop the polymerisation at an early stage so as to produce the finely divided seed polymer directly in vinyl chloride monomer. This mixture of seed polymer and monomer can then be polymerised under conventional free radical polymerisation conditions either as a mass process or suspension process. When the seed polymer is produced by a suspension or emulsion process the unconventional polymerisation conditions which give rise to a seed polymer having the desired order factor can be withdrawn before the polymerisation of the monomer is complete. In such cases the polymerisation of the monomer can then be continued most suitably under suspension conditions using conventional free radical polymerisation conditions. More vinyl chloride monomer and copolymerisable monomers if desired can be added to the system when the conventional polymerisation process is commenced. Alternatively emulsion or suspension polymerisation to produce the desired seed polymer may be carried to completion under the special polymerisation conditions in order to produce the seed as a suspension or emulsion polymer. This polymer can then be added to a conventional suspension polymerisation to provide a process according to the present invention. If it is desired to use seed polymer produced by emulsion or suspension techniques in a conventional mass polymerisation process it may be necessary to dry the seed polymer before adding it to a mass polymerisation system. When the seed polymer is prepared by solution polymerisation various techniques can be employed, i.e., the addition of miscible or immiscible liquids to the system in order to precipitate the seed polymer in the desired finely divided form.

It is generally found that a polymer of high or low order factor prepared according to the present invention cannot itself be used successfully to seed a further polymerisation according to the present invention as such a seed will not normally control the order factor of the polymer produced.

The final stage of the process of the present invention i.e., the conventional free radical polymerisation of the vinyl chloride monomer may be carried out using the well known suspension or mass vinyl chloride polymerisation techniques. Emulsion polymerisation is found to be unsatisfactory for the final stage of the process. As stated above most conventional vinyl chloride polymerisation techniques are operated between 30° and 80°C and it is preferred to operate the second stage of the process of the present invention at a temperature in this range.

It is found that very small quantities of the seed vinyl chloride polymer have a marked effect on controlling the order factor of the final product. In general the order factor of the final product will be similar to that of the seed. As the seed polymer is more expensive than the final product to produce owing to the specialist polymerisation technique that must be used for its production, it is economically desirable to employ only sufficient quantity of seed polymer to impart the desired crystallinity to the final product.

The minimum quantity of seed required varies considerably depending on the nature of the seed and the polymerisation to be seeded. In some cases it may be as low as 0.1% but is generally of the order of 0.5–5%. However the quantity of seed polymer employed can be varied widely, for example the weight ratio of seed polymer to monomer can be in the range 0.1:99.9 to 50:50 or preferably in the range 0.5:99.5 to 20:80. It is particularly preferred to use a ratio of seed polymer to monomer in the range 5:95 to 10:90.

Polymers of unusually high and low order factors have properties which differ from conventional vinyl chloride polymers. Polymers of low order factor for example have lower softening points which tends to make them easier to process, but at the same time have generally a higher tensile yield strength and are stiffer (higher tensile modulus) than conventional polymers.

Polymers of high order factor are mere suitable for the production of fibres and filaments than conventional polymers. Highly ordered vinyl chloride polymer has high thermal stability and higher softening point which makes it more suitable for applications where elevated temperatures are met with. The process of the present invention is particularly suitable for producing vinyl chloride polymers having order factors in the ranges 16 to 25 and 4 to 10.

The following examples illustrated the process of the present invention.

In these examples the order factors of the products was determined according to the principles set out in British Pat. Specification No. 847,676. However in order to reduce the time taken for each determination the X-ray diffraction measurements were carried out in an X-ray diffractometer and were thus obtained as an X-ray diffraction trace. Each trace showed a variation of intensity with Bragg angel and could be compared with the standard curve for amorphous polyvinyl chloride given in British Patent Specification No. 847,676 according to the method of J. L. Matthews et al. (loc. cit.) Other minor variations to the method described in British Patent Specification 847, 676 were that the sample sheets has thickness of about 0.005 rather than 0.003 and were pressed at room temperature and not at 160°C. The sheets were annealed for 1 hour at 120°C and allowed to cool naturally in air. The diffraction measurements for each sample were determined at 50°C, 80°C, 110°C and 140°C by successively heating each sample in the diffractometer with air at the appropriate temperature for 10 minutes. The result quoted for each polymer is the average of the results determined at each temperature. It is believed that these variations did not significantly affect the results obtained which are believed to be strictly comparable with those give in British Patent Specification No. 847,676.

EXAMPLES 1 – 5

A polyvinyl chloride seed having an order factor of 3.4 was prepared in latex form using ammonium stearate as the emulsifying agent. The final latex had a solids content of 33%. Samples of this polymer latex were mixed with water containing a polyvinyl alcohol suspending agent and an aqueous acetic acid solution (10%) was slowly added to each sample in order to destroy the stability of the polyvinyl chloride seed latex and to cause the finely divided emulsion polymer particles to pass into the vinyl chloride monomer which was added at this stage. This monomer was then polymerised under suspension polymerisation conditions for 6 hours at 60°C. using lauroyl peroxide as the polymerisation initiator. At the end of the polymerisation the product was separated from the aqueous phase by basket centrifuge and washed with water in the centrifuge. The products were than dried in a vacuum oven at 45°C for 24 hours and analysed by X-ray diffraction for their order factors. The quantities of reactants employed and the results obtained are given in Table 2.

Table 2

| Example | 1 | 2 | 3 | 4 | 5 |
|---|---|---|---|---|---|
| Vinyl chloride | 350 g | 470 g | 700 g | 700 g | 700 g |
| Distilled water | 2,210 g | 2,340 g | 2,576 g | 2,744 g | 2,786 g |
| PVC Latex (33% solids) | 940 g | 690 g | 336 g | 84 g | 21 g |
| Poly(vinyl alcohol) | 7 g | 7 g | 7 g | 1.75 g | 1.75 g |
| Lauroyl peroxide | 2 g | 2 g | 2 g | 2 g | 2 g |
| Acetic acid (10%) | 40.0ml | 27.0ml | 14.8ml | 3.8ml | 1.0ml |
| PVC/VC Ratio | 50/50 | 33.3/66.7 | 13/87 | 3.8/96.2 | 1/99 |
| Order Factor | 5.7 | 5.2 | 5.7 | 6.1 | 10.8 |

By way of contrast two samples of polyvinyl chloride were prepared using the procedure described in connection with Examples 1 – 5 but omitting the added PVC latex and the acetic acid. In one sample the level of polyvinyl alcohol was equivalent to that used in Examples 1, 2 and 3 and in the other equivalent to that used in Examples 4 and 5. In both cases the order factor of the resultant polyvinyl chloride was 14.

EXAMPLES 6 – 8

The procedure adopted in these example was similar to that used in Examples 1 – 5. The differences were (1) calcium chloride was used instead of acetic acid, (2) the polymerisation was carried out 60°C for 16 hours, and (3) and low order polyvinyl chloride latex was replaced by a high order latex which was synethesized at low temperature (−17°C) by a technique described in British patent No. 931,629. Methyl alcohol, the antifreeze agent, was removed from the latex by rotary evaporation to give a final latex having a solids content of 14.5%. The emulsifier in the latex was an alkyl aryl sulphonate. The order factor of this polyvinyl chloride seed polymer was 23.1.

The ingredients used and the order factors of the resultant products are given in Table 3.

Table 3

| Example | 6 | 7 | 8 |
|---|---|---|---|
| Vinyl chloride | 200 g | 100 g | 100 g |
| PVC latex | 35 g | 70 g | 140 g |
| Distilled water | 3,000 g | 3,000 g | 3,000 g |
| Poly(vinyl alcohol) | 4 g | 4 g | 4 g |
| Calcium chloride (10%) | 6 ml | 10 ml | 25 ml |
| Lauroyl peroxide | 1 g | 0.5 g | 0.5 g |
| PVC/VC Ratio | 5/100 | 17/83 | 25/75 |
| Order Factor | 21.2 | 22.5 | 21.2 |

EXAMPLE 9

A resin was made according to the following recipe (45 PVC/55VC).

| | |
|---|---|
| Vinyl chloride | 60 g |
| PVC latex | 375 g |
| Distilled water | 3,000 g |
| Poly(vinyl alcohol) | 2 g |
| Acetic acid (10%) | 40 ml |
| Lauroyl peroxide | 0.2 g |

The latex was synthesized at −18°C by a technique described in British Patent No. 931,629. Methyl alcohol antifreeze was removed from the latex by rotary evaporation, thus giving a solids content 14.5%. The emulsifier in the latex was ammonium laurate.

The procedure adopted in synthesizing the resin was similar to that adopted in Examples 4–8. The differences were
 i. the overall charge was stirred at 600 r.p.m.
 ii. the charge was heated at 60°C for 10 hours.
The average order factor of the coagulated latex was 20.8 and the average order factor of the resin was 19.8.

EXAMPLES 10–12

Three resins were made with the charges shown in Table 4. The emulsifier in the latex was Santomerse S sodium decyl benzene sulfonate made by Monsanto Chemical Company; the solids content of the latex was 50%.

The procedure adopted in these examples was similar to that in Examples 4–8. The differences were i) barium chloride was used instead of acetic acid ii) the charge was heated at 60°C for 8 hours.

Table 4

| Example | 10 | 11 | 12 |
| --- | --- | --- | --- |
| Vinyl chloride | 190 g | 150 g | 100 g |
| PVC latex | 20 g | 100 g | 200 g |
| Distilled water | 3,000 g | 3,000 g | 3,000 g |
| Alcotex 88-10 (polyvinyl alcohol) | 4 g | 4 g | 4 g |
| Barium chloride (10%) | 5 ml | 20 ml | 40 ml |
| Lauroyl peroxide | 1 g | 0.75 g | 0.5 g |

The resins were analysed by X-ray diffraction and the average order factors are shown in the following Table 5. It can be seen that the order factors tended to be slightly above the seed.

Table 5

| Example | PVC/VC ratio | Average Order Factor |
| --- | --- | --- |
| Control | Coagulated PVC latex | 16.5 |
| 10 | 10/90 | 18.6 |
| 11 | 30/70 | 18.7 |
| 12 | 40/60 | 23.0 |

EXAMPLES 13–15

Four experimental resins were made with the charges shown in the table. The seed resin was made by suspension polymerisation at a temperature of 20°C.

A solution of Methocel 65HG 50 hydroxypropyl methyl cellulose in the distilled water was charged to a 1 gallon stainless steel reactor. The seed resin and lauroyl peroxide were added and the reactor was closed, purged and evacuated. The vinyl chloride was sucked into the reactor. The mixture was stirred at 700 r.p.m. and heated to 60°C for the time shown in Table 6. The mixture was cooled and vented to atmosphere. The product was separated from the aqueous phase by basket centrifuge and washed with water in the centrifuge. The resin dried in a vacuum oven at 45°C for 24 hours.

Table 6

| Example | 13 | 14 | 15 |
| --- | --- | --- | --- |
| Vinyl chloride | 700 g | 700 g | 700 g |
| Seed resin | 7 g | 3.5 g | 14 g |
| Distilled water | 2,800 g | 2,800 g | 2,800 g |
| Methocel 65HG 50 | 7 g | 7 g | 7 g |
| Lauroyl peroxide | 2 g | 2 g | 2 g |
| Polymerisation time | 16 hours | 16 hours | 16 hours |

The powders were analysed by X-ray diffraction, and average order factors are shown in the following Table 7.

Table 7

| Example | PVC/VC Ratio | Average Order Factor |
| --- | --- | --- |
| Control | Seed resin | 17.7 |
| 14 | 0.5/100 | 17.7 |
| 13 | 1/100 | 18.2 |
| 15 | 2/100 | 18.4 |

COMPARATIVE TESTS 16, 17

Two experimental resins were made with the charges shown in Table 8. The seed resin was the resin prepared by Example 11. The Methocel 65HG 50 was dissolved in the distilled water and the solution poured into a 1 gallon stainless steel container. The seed resin and lauroyl peroxide were added and the reactor was closed, purged and evacuated. The vinyl chloride was sucked into the reactor. The mixture was stirred at 700 r.p.m. and heated at 60°C for the time shown in Table 8. The mixture was cooled and vented to atmosphere. The product was separated from the aqueous phase by basket centrifuge and washed with water in the centrifuge. The resin was dried in a vacuum over at 45°C for 24 hours.

Table 8

| Example | 16 | 17 |
| --- | --- | --- |
| Vinyl chloride | 290 g | 120 g |
| Seed resin | 10 g | 30 g |
| Methocel 65HG 50 | 3 g | 3 g |
| Distilled water | 3,200 g | 3,300 g |
| Lauroyl peroxide | 1 g | 1 g |
| Polymerisation Time | 12 hours | 10 hours |

The powders were analysed by X-ray diffraction and the average order factors were as follows. The order factors of the products returned to the normal suspension value. This test demonstrates that polymers prepared by the process of the present invention cannot themselves normally be used as seeds.

Table 9

| Example | PVC/VC ratio | Average Order Factor |
| --- | --- | --- |
| Control | Seed resin | 21.2 |
| 16 | 4/100 | 14.1 |
| 17 | 25.75 | 14.4 |

EXAMPLE 18 (45PVC/55VC)

An experimental resin was made using a 1,000 gallon stainless steel reactor with the following recipe.

| | |
|---|---|
| Vinyl chloride | 550 kg |
| Distilled water | 440 gallons |
| PVC latex (35% solids) | 1,230 gallons |
| Methocel 65HG 50 | 3 kg |
| Capryloyl Peroxide | 400 g |
| Acetic Acid (25%) | 6 gallons |

The latex was the same as that in Examples 4–8.

The procedure was similar to that in Examples 4–8 although a stirrer speed of 300 r.p.m. was used. The resin was dried in an air-circulating oven.

The powder was analysed by X-ray diffraction and the average total order factor was 7.7.

The resins were mixed with 2.5 p.h.r. of Mellite 31 a dibutyl thio stabiliser and stearic acid as shown. The powder mixes were milled into hides at a temperature of 160°/140°C and then compression moulded into test pieces at 180°C. Vicat softening points were measured according to BS2782 Part 1, 1965, Method 102D and the results are shown in the following table.

| | Vicat Softening Points (°C) | |
|---|---|---|
| | Level of Stearic Acid (p.h.r.) | |
| | 0 | 1 |
| Commercial Suspension Polymer Breon S110/10 | 84.5 | 82.0 |
| Example 18 | 79.0 | 76.7 |

The tensile properties of these compounds were measured as follows. Test pieces 2.10 in × 0.03 in × 0.212 in were compression moulded at 180°C and pulled on an Instron tensile test machine at 22°C. The results were as follows.

| | Level of Stearic Acid (p.h.r.) | Tensile Properties (MN/m$^2$) | | |
|---|---|---|---|---|
| | | Upper Yield Stress | Tensile Strength at Break | Tensile Modulus |
| Breon S110/10* | 0 | 54.9 | 52.2 | 860 |
| | 1 | 53.8 | 46.9 | 885 |
| Example 18 | 0 | 60.2 | 48.7 | 1330 |
| | 1 | 58.0 | 42.4 | 1130 |

*a polyvinyl chloride polymer made by BP Chemicals International Limited (UK)

These results show the improved yield strength and tensile modulus of low order factor polymers.

EXAMPLES 19–21

Three resins were made by suspension polymerisation using a vinyl chloride — vinyl acetate copolymer as seed. The vinyl acetate content of the copolymer was 16% and the copolymer was made by suspension polymerisation.

The resins were made with the following recipe

| | |
|---|---|
| Vinyl chloride | 700 g |
| Copolymer seed | varied |
| Distilled water | 2,800 g |
| Methocel 65HG 50 | 3.5 g |
| Lauroyl Peroxide | 2 g |

The weight of copolymer seed was varied and these weights are shown in Table 10.

A solution of the Methocel 65HG 50 in the distilled water was charged to a 1 gallon stainless steel reactor. The copolymer seed and the lauroyl peroxide were added and the reactor was closed, purged with nitrogen and evacuated.

The vinyl chloride was sucked into the reactor and the charge stirred at 700 r.p.m. The charge was heated at 60°C for 8 hours.

After this period, the charge was cooled and the vinyl chloride was vented off. The product was separated from the aqueous phase by basket centrifuge and washed with water in the centrifuge.

The resin was dried in a vacuum oven at 45°C for 24 hours. The powders were analysed by X-ray diffraction and the average order factors are shown in Table 11.

TABLE 10

| Example | Wt. of Copolymer (g) |
|---|---|
| 19 | 70 |
| 20 | 35 |
| 21 | 7 |

TABLE 11

| Example | Copolymer /VC Ratio | Average order factor |
|---|---|---|
| Copolymer resin seed | | 4.1 |
| 19 | 10/100 | 8.7 |
| 20 | 5/100 | 5.6 |
| 21 | 1/100 | 8.0 |

COMPARATIVE TEST 22

A suspension resin was made by incorporating a mass resin as seed. The mass resin had been synthesized at 20°C using a 25 ml. bomb. The average order factor of this resin was 18.6.

The suspension resin was made with the following recipe.

| | |
|---|---|
| Vinyl chloride | 150 g. |
| Mass resin seed | 1.5 g. |
| Distilled water | 3,300 g. |
| Methocel 65HG 50 | 1 g. |
| Lauroyl Peroxide | 0.5 g. |

A solution of the Methocel 65HG 50 in the distilled water was charged, together with the mass resin and the lauroyl peroxide to a 1 gallon stainless steel reactor. The reactor was closed, purged with nitrogen and evacuated. The vinyl chloride was sucked into the reactor. The mixture was stirred at 700 r.p.m. and heated at 60°C for 15 hours. The product was separated from the aqueous phase by basket centrifuge and washed with water in the centrifuge. The resin was dried in a vacuum oven at 45°C for 24 hours.

The powder was analysed by X-ray diffraction and the average order factor was 13.9.

EXAMPLE 23 5PVC/100 VC

A suspension resin was made by a similar procedure to that adopted in Example 22. The recipe was

| | |
|---|---|
| Vinyl chloride | 200 g |
| Mass resin seed | 10 g |
| Distilled water | 3,000 g |
| Methocel 65HG 50 | 2 g |
| Lauroyl Peroxide | 0.2 g |

The average order factor of the mass resin seed was 18.3 and the average order factor of the suspension resin was 19.0.

COMPARATIVE TEST 24 (2PVC/100VC)

A suspension resin was made by a similar procedure to that adopted in Example 22. The recipe was

| | |
|---|---|
| Vinyl chloride | 100 g |
| Mass resin seed | 2 g |
| Methocel 65HG 50 | 2 g |
| Distilled water | 3,000 g |
| Lauroyl peroxide | 0.2 g |

The average order factor of the mass resin seed was 18.2 and the average order factor of the suspension resin was 14.7.

EXAMPLE 25 (10PVC/100VC)

A suspension resin was made by a similar procedure to that adopted in Example 22. The recipe was

| | |
|---|---|
| Vinyl chloride | 100 g |
| Mass resin seed | 10 g |
| Distilled water | 3,000 g |
| Methocell 65HG 50 | 2 g |
| Lauroyl Peroxide | 0.2 g |

EXAMPLES 26 and 27

Two resins were made with the charges shown in Table 13.

The seed resin was made by suspension polymerisation at a temperature of 20C.

The initiators and seed were put into a 1 gallon stainless steel reactor which was then closed and evacuated. The vinyl chloride was added and the contents stirred at 30 rpm.

The reactor was heated at 54°C for 2 hours and then cooled and the mixture was vented to atmosphere.

Table 13

| Example | 26 | 27 |
|---|---|---|
| Vinyl chloride | 985 g. | 965 g. |
| Seed resin | 15 g. | 35 g. |
| Capryloyl Peroxide | 1.8 g. | 1.8 g. |
| Perkadox Y 16 | 1.5 g. | 1.5 g. |

The product was removed from the reactor and the powder examined by X-ray diffraction analysis. The results are shown in Table 14.

Table 14

| Example | Initial PVC/VC Ratio | Final PVC/VC Ratio | Average Order Factor |
|---|---|---|---|
| Control (No seed) | | | 14.8 |
| Seed Resin | | | 17.7 |
| 26 | 1.5/100 | 3/100 | 18.0 |
| 27 | 3.5/100 | 6/100 | 16.5 |

MEASUREMENTS OF FLEXURAL MODULI

Three resins were made into hides and test pieces obtained for flexural modulus measurements at 20°C and 40°C. The specimens were tested according to ASTM standards, part 27, D790: 10.11.1 The average of the flexural moduli at the two temperatures is quoted below.

| Resin | Average Order Factor | Average Flexural Modulus (kg cm$^{-2}$) |
|---|---|---|
| Commercial Suspension Polymer Breon S110710 | 14.7 | 23900 |
| Example 7 | 22.5 | 26300 |
| Example 14 | 18.2 | 26500 |

These results show the improved stiffness of high order factor polymers prepared according to the present invention.

COMPARATIVE TEST 28

This resin was synthesized by a method similar to that quoted for examples 13–15. The recipe was similar the recipe for examples 15 except that 0.7 g. of seed resin was used so as to give an initial PVC/vinyl chloride ratio of 0.1/100. The seed resin had been synthesized at 20°C by suspension polymerisation. The order factor of the product was not affected by the feed.

This comparative test shows that 0.1% of a suspension polymerised seed resin is insufficient to control the order factor whereas 0.5% is sufficient (cf Example 13) under the conditions used.

| Example | Average Order Factor |
|---|---|
| Seed resin | 18.4 |
| Product | 13.3 |

I claim:

1. A process for the production of a vinyl chloride polymer containing a major proportion of vinyl chloride which comprises adding a seed vinyl chloride polymer or copolymer containing a major proportion of vinyl chloride in a finely divided form having an average particle size of less than 200 μm and having an order factor above 16 or below 10, said seed polymer not having been prepared by a process defined in this claim, to vinyl chloride monomer and polymerising at a temperature in the range of 30°–80°C the vinyl chloride monomer in suspension or in mass using a free radical polymerisation initiator with said seed polymer or copolymer dispersed therein to produce a vinyl chloride containing polymer having an order factor above 16 or below 10, respectively, the weight ratio of said seed polymer or copolymer to vinyl chloride containing monomer being in the range of 0.1 : 99.9 to 50 : 50.

2. A process according to claim 1 where the seed vinyl chloride polymer is prepared by mass polymerisation.

3. A process according to claim 1 where the seed vinyl chloride polymer is prepared by suspension polymerisation.

4. A process according to claim 1 where the seed vinyl chloride polymer is prepared by emulsion polymerisation.

5. A process according to claim 1 where the free radical polymerisation is operated at a temperature in the range 45° to 70°C.

6. A process according to claim 1 where the weight ratio lies in the range of 0.5:99.5 to 20:80.

7. A process according to claim 6 where the weight ratio lies in the range 5:95 to 10:90.

* * * * *

UNITED STATES PATENT OFFICE
CERTIFICATE OF CORRECTION

Patent No. 3,856,767   Dated December 24, 1974

Inventor(s) ALAN CHARLES STURT

It is certified that error appears in the above-identified patent and that said Letters Patent are hereby corrected as shown below:

Title page, insert

"Assignee: BP CHEMICALS INTERNATIONAL LIMITED
London, England"

Col. 1, line 29, insert inches (") after "0.003"

Col. 1, line 57, correct the spelling of "traverse"

Col. 9, line 19, insert "-tin" after "thio" and before "stabiliser".

Col. 11, in Table 13, after "Perkadox Y 16" insert
--di(tertiarybutyl cyclohexyl)peroxydicarbonate--

Signed and sealed this 15th day of April 1975.

(SEAL)
Attest:

RUTH C. MASON
Attesting Officer

C. MARSHALL DANN
Commissioner of Patents
and Trademarks